US008500313B2

(12) United States Patent
DeVries et al.

(10) Patent No.: US 8,500,313 B2
(45) Date of Patent: Aug. 6, 2013

(54) INTEGRATED LIGHT FIXTURE AND NIGHT LIGHT

(76) Inventors: Ronald R. DeVries, Palos Heights, IL (US); David Manning, Orland Park, IL (US)

( * ) Notice: Subject to any disclaimer, the term of this patent is extended or adjusted under 35 U.S.C. 154(b) by 321 days.

(21) Appl. No.: 13/021,050

(22) Filed: Feb. 4, 2011

(65) Prior Publication Data

US 2012/0081028 A1 Apr. 5, 2012

Related U.S. Application Data

(60) Provisional application No. 61/388,435, filed on Sep. 30, 2010.

(51) Int. Cl.
*B60Q 1/00* (2006.01)

(52) U.S. Cl.
USPC .......................................... 362/368; 362/457

(58) Field of Classification Search
USPC .......................................... 362/362, 368, 457
See application file for complete search history.

(56) References Cited

U.S. PATENT DOCUMENTS

| | | | | |
|---|---|---|---|---|
| 5,548,494 | A * | 8/1996 | Blackman | 362/183 |
| RE36,696 | E * | 5/2000 | Blackman | 362/20 |
| 7,431,473 | B2 * | 10/2008 | Wilson et al. | 362/147 |
| 2012/0195032 | A1 * | 8/2012 | Shew | 362/183 |

* cited by examiner

*Primary Examiner* — Thuy Vinh Tran
(74) *Attorney, Agent, or Firm* — Howard B. Rockman

(57) ABSTRACT

A light fixture assembly having a plurality of sockets to receive a plurality of electrically powered sources of illumination, and a plurality of receptacles to receive a plurality of LED lights, the assembly including a housing. The plurality of receptacles are mounted on the fixture housing and a logic board is mounted in the housing, the logic board being electrically connected to a switch, and the switch is electrically connected to a source of electrical power. Separate electrical connections extend between the logic board and the sockets, and between the logic board and a voltage reduction device. The voltage reduction device is electrically connected to the receptacle to provide a lower voltage to the LED receptacles compared to the voltage of the electric power supplied to the light bulb. The switch is operable between off and on positions; and the logic board activates and deactivates the electrical energy provided to the sockets and to the LED receptacles upon operation of the switch.

9 Claims, 1 Drawing Sheet

INTEGRATED LIGHT FIXTURE AND NIGHT LIGHT

Applicants claim priority of Provisional Application Ser. No. 61/388,435, filed Sep. 30, 2010.

BACKGROUND OF THE INVENTION

1. Field of the Invention

The present invention relates to light fixtures having an integrated low voltage LED night light for use in residential and commercial bathroom facilities, such as hotels, apartment buildings, and single home dwellings.

2. Description of the State of the Art

Light fixtures have been used to house and support light bulbs for lighting rooms, streets, driveways, sidewalks, bathrooms, offices, and the like. Costs associated with powering light bulbs especially in large buildings and particularly in hotels have risen dramatically due to the cost of energy. Turning off lights in hotel rooms for example would help hotels save on energy costs, but often that cost isn't passed to the consumer. Conversely, the consumer, staying in a hotel room, has an incentive to leave the lights in their room on particularly at night so that they can navigate easily to the bathroom if they need to. This incentive also drives up the cost of a hotel's energy bill. An object of the present invention is to reduce the cost of electricity in hotels and apartment buildings.

Currently, light fixtures have secondary light systems. These secondary light systems are on different power lines, use higher voltage non-LED lights, rely on movement sensors or timers, or do you use logic or circuit boards to receive sequences to determine which light to illuminate.

There are several presently available lighting fixtures with secondary lights. See for example, U.S. Pat. No. 5,345,149 (the 149' Patent), U.S. Pat. No. 5,548,494 (the 494' Patent), U.S. Pat. No. 4,839,562 (the 562' Patent), U.S. Pat. No. 7,375,476 (the 476' Patent), U.S. Patent Publication No. 2009/0072766 (the 766' Patent Publication), U.S. Pat. No. 7,122,976 (the 976' Patent), and U.S. Pat. No. 7,405,524 (the 524' Patent).

The '149 patent discloses a lighting system with both fluorescent and incandescent lamps, operated by a switch. The systems operate at a lower voltage, dropping the voltage from 120 volt to 115 volt. This is not enough to activate LED lights, which are not part of the disclosed system. Also, this patent does not disclose a circuit board with logic to provide separate electrical power paths, one to an incandescent or fluorescent regular lighting system, and another path to a driver to activate a plurality of LED lights at a lower voltage.

The '494 patent discloses two embodiments of a light fixture having a fluorescent light for room lighting, and a separate sensor activated incandescent night light 156 connected directly to house current 32 (FIG. 9). This patent does not disclose a lower voltage night light, nor an on-off sequence switch to toggle between normal lighting and the night light.

The '562 patent discloses a triac device inserted between the light bulb and the socket for the bulb in a lamp, whereby the lamp can also function as a night light. As seen in FIG. 2, the triac 11 is connected to a low voltage D.C. power supply 14 to control the triac functions. The system has a single bulb B connected to standard AC current, but through the triac. The '562 patent systems includes a wall switch that can rapidly be turned on, off, and on again to change the mode of operation of the triac. You have advised me previously that these types of on-off-on switches are presently available in the market.

However, the '562 patent does not disclose, in combination, the operation of separate incandescent and lower voltage LED light sources in a single fixture, operated through a path-separating logic board and a low voltage LED driver.

The '476 patent discloses a lighting circuit for activating fluorescent lamps and an LED array. The LED array is not used as a night light, and a single toggle switch operates one of the other light system. The '476 patent does not disclose a logic board to send electrical energy to either a series of incandescent lights or an LED driver for operating an LED night light array at lower voltage.

The '766 patent publication discloses a lighting system, including a night light mode, using timers and outdoor lighting conditions to change the lighting modes. The '766 publication does not disclose a single fixture for incandescent light and LED lights with a logic board to operate one circuit or the other at different voltages, and an on-off-on switch sequence to control the operation of the night light.

The '976 patent disclosure is similar to the '766 publication disclosure, and discloses motion detection and measured light levels to actuate outdoor lights, including a night light mode, all computer controlled. The '976 patent does not use LED's as an indoor bathroom night light, an electric power supply logic board, nor an on-off-on switch to control the operation of fluorescent lights and an LED light array.

The '524 patent is also similar to the '976 patent and the '766 publication, in that the '524 patent discloses an indoor or outdoor lighting system responsive to measured light levels and detection mode. The '524 system does not use low voltage LED's nor an on-off-on light switch to actuate either the incandescent lights or the LED lights.

SUMMARY OF THE INVENTION

A light fixture assembly having a plurality of sockets to receive sources of electrically powered illumination, such as standard light bulbs, and at least one receptacle to receive at least one LED, said assembly comprising, a housing with a logic board mounted in the housing. The logic board is electrically connected to a switch that is connected to a source of electrical power. A first electrical connection extends between the logic board and the sockets, and a second electrical connection extends between the logic board and a voltage reduction device. The voltage reduction device is electrically connected to the LED receptacles for providing a lower voltage to the LEDs compared to the electric power supplied to the light bulbs. The switch is operable between off and on positions, such that the sockets are electrically energized and the LEDs are de-energized when the switch is moved from an off to an on position. The LEDs are electrically energized and the light bulbs are de-energized when the switch is moved from an on position to an off position, and then rapidly to an on position. When the switch is in the off position, the light bulbs and the LEDs remain de-energized.

BRIEF DESCRIPTION OF THE DRAWINGS

The following figures are included to better illustrate the embodiments of the devices and techniques of the present invention. In these figures, like numerals represent like features in the several views. It is to be noted that these figures illustrating the several views of the present invention, unless stated otherwise, are not necessarily drawn to scale. Nor are the contents of the drawings to be considered as limiting the scope of the present invention as defined in the claims.

DETAILED DESCRIPTION OF THE ILLUSTRATED EMBODIMENTS

Figure 1:
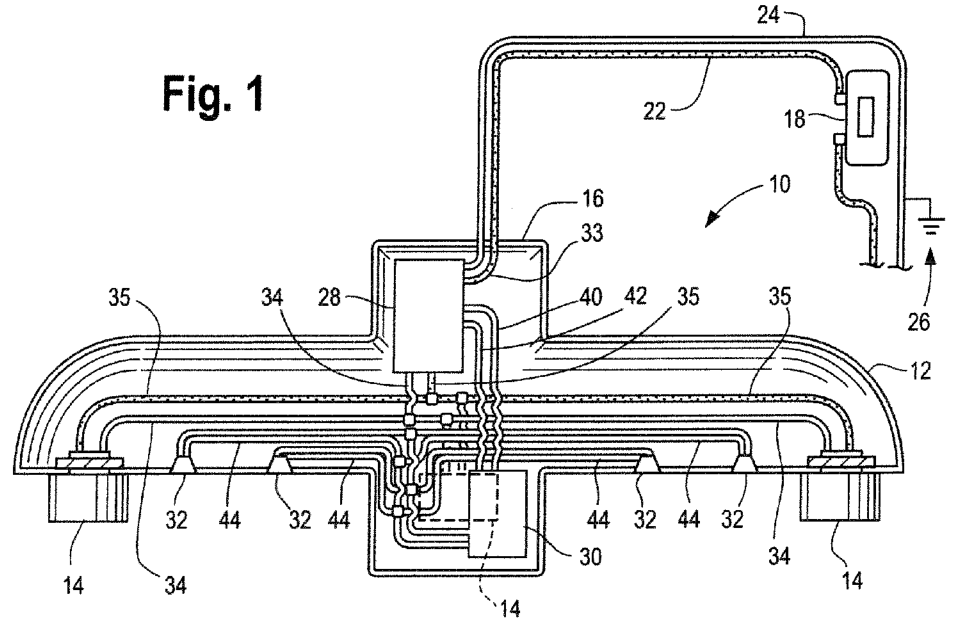
FIG. 1 is a top schematic embodiment of the light fixture with an integrated night light, wherein the electrical power is alternately distributed by a single pole, single throw wall switch.

Referring to FIG. 1, the numeral 10 generally designates the light fixture of the present invention. The fixture 10 comprises a housing 12 to which a plurality of light bulb sockets 14 are mounted, as is known in the art. Sockets 14 are normally adapted to hold three 60 watt bulbs, a single bulb, or any quantity of bulbs per design. The bulbs can be incandescent or fluorescent, or any other light source known in the art. The rear portion 16 of housing 12 is adapted to be firmly mounted on the bathroom wall (not shown), or the wall of any room where both regular lighting and night lighting are desired in a single fixture.

In the illustrated embodiment, the light fixture 10 is controlled by single pole, single throw wall switch 18, normally mounted on the wall adjacent the entry to a typical bathroom. The present invention is adapted to operate with any standard bathroom wall switch 18. An input electrical power line 20 and an output electrical power line 22 are connected to switch 18 as is known in the art. A neutral line 24 is also preferably attached to a ground connection 26.

Fixture housing 12 includes a printed circuit board 28 comprising a logic system as explained in detail below. Also mounted to housing 12 is an LED driver 30 that is electrically connected to a plurality of low voltage LED light receptacles 32. Each receptacle 32 is adapted to receive a replacement LED light.

The wiring between wall switch 18, circuit board 28, LED driver 30, light bulb sockets 14 and LED receptacles 32 is as follows: Neutral wire 24 extends from ground 26 to contact point 33 on circuit board 28. First electrical lines 34, extend from an output of circuit board 28 at one end, and to each of the sockets 14 at the other end to transmit electrical energy from circuit board 28 to each socket 14.

A second pair of electrical lines 40, 42 are electrically connected between a second output of circuit board 28 and the input to LED driver 30 to provide 120 volt input power to the LED driver 30. A plurality of electrical wires 44 extend from the output of LED driver 30 to each of the LED receptacles 32. As is known in the art, LED driver 30 converts 120 volt AC electrical energy to low voltage DC electrical energy, for purposes to be explained.

In operation, for normal lighting of the bathroom in which fixture 10 is installed, wall switch 18 is moved from the off position to the on position when a user enters the bathroom. The logic in circuit board 28 transmits electrical current from circuit board 28 through lines 34, 35 to activate the light bulbs disposed in each socket 14, thus illuminating the bathroom for normal use. When the user leaves the bathroom, switch 18 is moved to the off position, and the logic in the circuit board 28 cuts off the flow of electricity to sockets 14, darkening the bathroom.

When the user desires to turn on the LED lights in receptacles 32, without leaving the bulbs in sockets 14 illuminated, wall switch 18 is rapidly moved on, then off, and on again in rapid movements. The logic embedded in circuit board 28 transmits electricity to electric lines 40, 42, and not to wires 34, 35. The LED driver 30, upon receiving a 120 volt AC input from printed circuit board 28, converts the 120 volt AC to a low wattage DC output, as is known in the art. In the illustrated embodiment, the output voltage from LED driver is 0.5 watts, however, the power requirements for the LED lights in receptacle 32, and thus the power output of LED driver 30, may vary. The low wattage output of LED driver 30 is transmitted to the LED lights in receptacles 32 through wires 44, illuminating the LED lights while the bulbs located in sockets 14 remain off. A low level light is then provided in the bathroom, preferably throughout the night.

In the morning, the wall switch 18 is moved to the off position, shutting off electrical power to both the LED lights in receptacles 32 and the bulbs in sockets 14. When the wall switch 18 is moved to the on position, and left there, the bulbs in socket 14 are turned on, illuminating the bathroom for normal use. Turning wall switch 18 to the off position will darken the bathroom. When the user desires to turn on LED lights in receptacles 32 the next night, the above rapid on-off-on process is repeated.

The present invention provides both 120 volt, 60 to 100 watt light bulbs, and 0.5 to 1.0 watt LED lights, for example, to be operated from a standard single pole, single throw 15 amp 120 volt wall switch, normally found in residential and commercial bathrooms.

Figure 2:
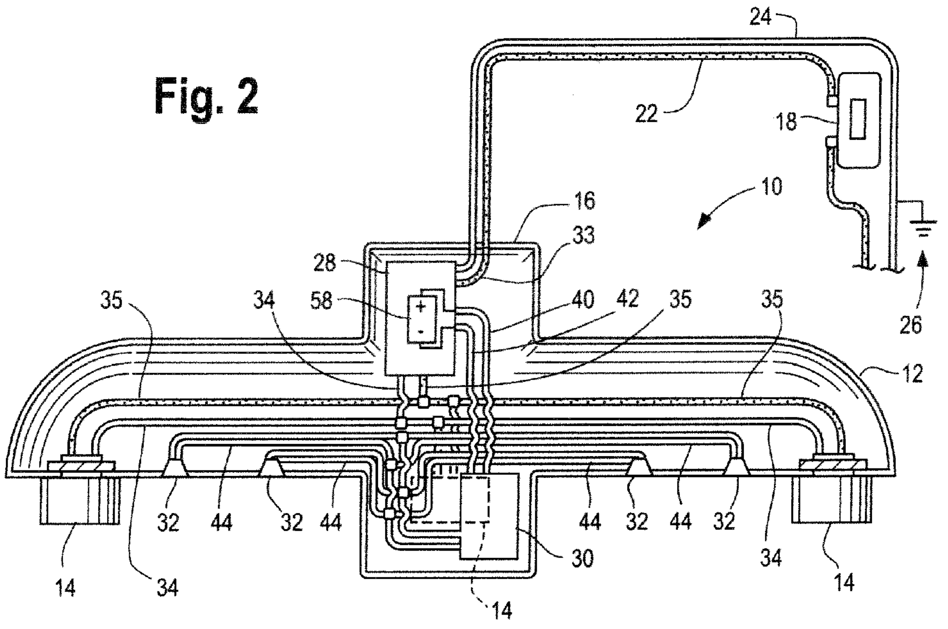
FIG. 2 is a top schematic view of an embodiment of the light fixture with an integrated night light apparatus, wherein the second electrical circuit is powered by a battery.

Referring to FIG. 2, in another embodiment of the invention, the light fixture 10 is controlled by one single pole, single throw light switch 18. The second pair of electrical lines 40, 42 are electrically connected to a battery 58 within the light fixture housing 16 and the input to LED driver 30 to provide battery input power to the LED driver 30. The logic system of the circuit board 28 determines when electrical power flows and doesn't flow to the LED driver 30. A plurality of electrical wires 44 extend from the output of LED driver 30 to each of the LED receptacles 32. This embodiment eliminates the need for electrical power to the LED driver 30 from the output electrical power line 22 to power the LED lights.

The foregoing descriptions of the illustrated embodiments of the invention has been presented for purposes of illustration and description, and are not intended to be exhaustive or to limit the invention to the precise forms disclosed. The description was selected to best explain the principles of the invention and practical application of these principals to enable others skilled in the art to best utilize the invention in various embodiments and various modifications as are suited to the particular use contemplated. It is intended that the scope of the invention not be limited by the specification, but be defined by the claims set forth below.

What is claimed:

1. A light fixture assembly having at least one socket to receive at least one source of electrically powered illumination, and at least one receptacle to receive at least one LED, said assembly comprising:

a housing;

said at least one socket and said at least one receptacle mounted on said housing;

a logic board mounted in said housing, said logic board electrically connected to a switch, said switch electrically connected to a source of electrical power;

a first electrical connection extending between said logic board and said at least one socket, and a second electrical connection extending between said logic board and a switch enabled voltage reduction device;

said voltage reduction device electrically connected to said at least one receptacle for providing a lower voltage to said at least one receptacle compared to the voltage of the electric power supplied to said at least one socket;

said switch operable between off and on positions; and said logic board activating and deactivating the electrical energy provided to said at least one socket and to said at least one receptacle upon operation of said switch.

2. The light fixture assembly of claim 1, wherein:

said at least one socket is electrically energized and said at least one receptacle de-energized when said switch is moved from an off to an on position; and said at least one receptacle is electrically energized and said at least one socket de-energized when said switch is moved from an on position to an off position, and then the switch is moved rapidly to an on position.

3. The light fixture assembly of claim 2, wherein said at least one socket and said at least one receptacle are de-energized when said switch is in said off position.

4. The light fixture assembly of claim 1, wherein said switch is located remote from said housing.

5. The light fixture assembly of claim 1, wherein the switch is a single pole, single throw switch.

6. The light fixture assembly of claim 1 wherein the logic board transmits electrical energy to said at least one socket when said switch is moved from an off position to an on position.

7. The light fixture assembly of claim 6, wherein the logic board transmits electrical energy to said at least one receptacle when said switch is moved rapidly between an on position, an off position, and back to an on position.

8. The light fixture of claim 7 wherein said logic board shuts off the source of electrical energy to said at least one receptacle and to said at least one socket when said switch is in said off position.

9. A method of alternately providing electrical power from a switch operated electrical source between at least one socket mounted to a housing and at least one receptacle mounted on said housing, each socket adapted to receive a first source of illumination activated by a first voltage, and at least one receptacle mounted on said housing, each receptacle adapted to receive a second source of illumination activated by a second voltage, and second voltage being lower than the first voltage resulting from a switch enabled voltage drop, the switch moveable between an on position and an off position, comprising the steps of:

transmitting electrical power to said at least one socket when said switch is moved to the on position;

terminating electrical power to said at least one socket when said switch is moved to the off position; and transmitting electrical power to said at least one receptacle and terminating electrical power to said at least one socket when said switch is moved from the on position to the off position and then rapidly returned to the on position.

* * * * *